United States Patent
Liu et al.

(10) Patent No.: US 12,367,665 B2
(45) Date of Patent: Jul. 22, 2025

(54) TRAINING MACHINE LEARNING MODELS BASED ON UNLABELED DATA

(71) Applicant: Palo Alto Research Center Incorporated, Palo Alto, CA (US)

(72) Inventors: Qun Liu, Sunnyvale, CA (US); Matthew Shreve, Mountain View, CA (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 487 days.

(21) Appl. No.: 17/835,158

(22) Filed: Jun. 8, 2022

(65) Prior Publication Data

US 2023/0401829 A1 Dec. 14, 2023

(51) Int. Cl.
*G06V 10/774* (2022.01)
*G06V 10/762* (2022.01)

(52) U.S. Cl.
CPC ........ *G06V 10/7753* (2022.01); *G06V 10/762* (2022.01)

(58) Field of Classification Search
CPC ... G06V 10/7753; G06V 10/762; G06V 10/82
USPC ......................................................... 382/155
See application file for complete search history.

(56) References Cited

U.S. PATENT DOCUMENTS

| | | | | |
|---|---|---|---|---|
| 11,341,653 | B2 * | 5/2022 | Kim | G06T 7/143 |
| 2020/0380304 | A1 * | 12/2020 | Sallee | G06T 7/136 |
| 2021/0056411 | A1 * | 2/2021 | Jung | G06F 11/3447 |
| 2023/0116417 | A1 * | 4/2023 | Taccari | G06V 10/774 706/15 |
| 2023/0368498 | A1 * | 11/2023 | Jawahar | G06V 10/7715 |

OTHER PUBLICATIONS

LiDAM: Semi-Supervised Learning with Localized Domain Adaptation and Iterative Matching (Year: 2020).*
Qun Liu et al., LiDAM: Semi-Supervised Learning with Localized Domain Adaptation and Iterative Matching, Nov. 23, 2020, Palo Alto Research Center, Palo Alto, California.

* cited by examiner

*Primary Examiner* — Jennifer Mehmood
*Assistant Examiner* — Pardis Sohraby
(74) *Attorney, Agent, or Firm* — Womble Bond Dickinson (US) LLP (57) ABSTRACT

A method of labeling data and training a model is provided. The method includes obtaining a set of images. The set of images includes a first subset and a second subset. The first subset is associated with a first set of labels. The method also includes generating a set of pseudo labels for the set of images and a second set of labels for the second subset based on the first subset, the second subset, a first machine learning model, and a domain adaption model. The method further includes generating second machine learning model. The second machine learning model is generated based on the set of images, the set of pseudo labels, the first set of labels, and the second set of labels. The second set of labels is updated based on one or more inferences generated by the second machine learning model.

20 Claims, 6 Drawing Sheets

TRAINING MACHINE LEARNING MODELS BASED ON UNLABELED DATA

TECHNICAL FIELD

Implementations of the present disclosure relate to training machine learning models, and more particularly to labelling data that is used train machine learning models.

BACKGROUND

Machine learning models, such as neural networks, may be used to perform various task, operations, functions, etc. For example, a machine learning model may process/analyze data and may generate inferences, predictions, outputs, etc. In another example, a machine learning model may analyze/process images and determine whether a certain object is depicted in the images. Developing machine learning models may be an expensive and time consuming process. For example, it may be difficult to obtain training data or test data used to train/test the machine learning models.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, machine learning models, such as neural networks, may be used to perform various task, operations, functions, etc. Developing machine learning models may be an expensive and time consuming process. In particular, it may be difficult to obtain training data or test data used to train/test the machine learning models. Although images may be generally available for use in training/testing, the images are often not labeled (e.g., not tagged, not annotated, etc.). In addition, training machine learning models to provide accurate inferences/predictions is difficult task as well.

Methods and systems related to labeling (e.g., tagging, annotating, etc.) data and/or related to generating/training machine models (e.g., classifiers, neural networks, convolutional neural networks (CNNs), etc.) are described herein.

The systems and methods described herein solve the training machine learning models and labeling data that may be used to train machine learning models. In some embodiments, a first machine learning model is used to generate pseudo labels and labels for unlabeled data, based on a first machine learning model, a domain adaption model, and a set of labeled data. Once the pseudo labels and labels have been generated for the set of data, it is used to train a second machine learning model. As the second machine learning model is trained, the pseudo labels and/or labels for the set of data are updated. At the end of the training process, the second machine learning model is trained and the set of data is labeled.

Figure 1:
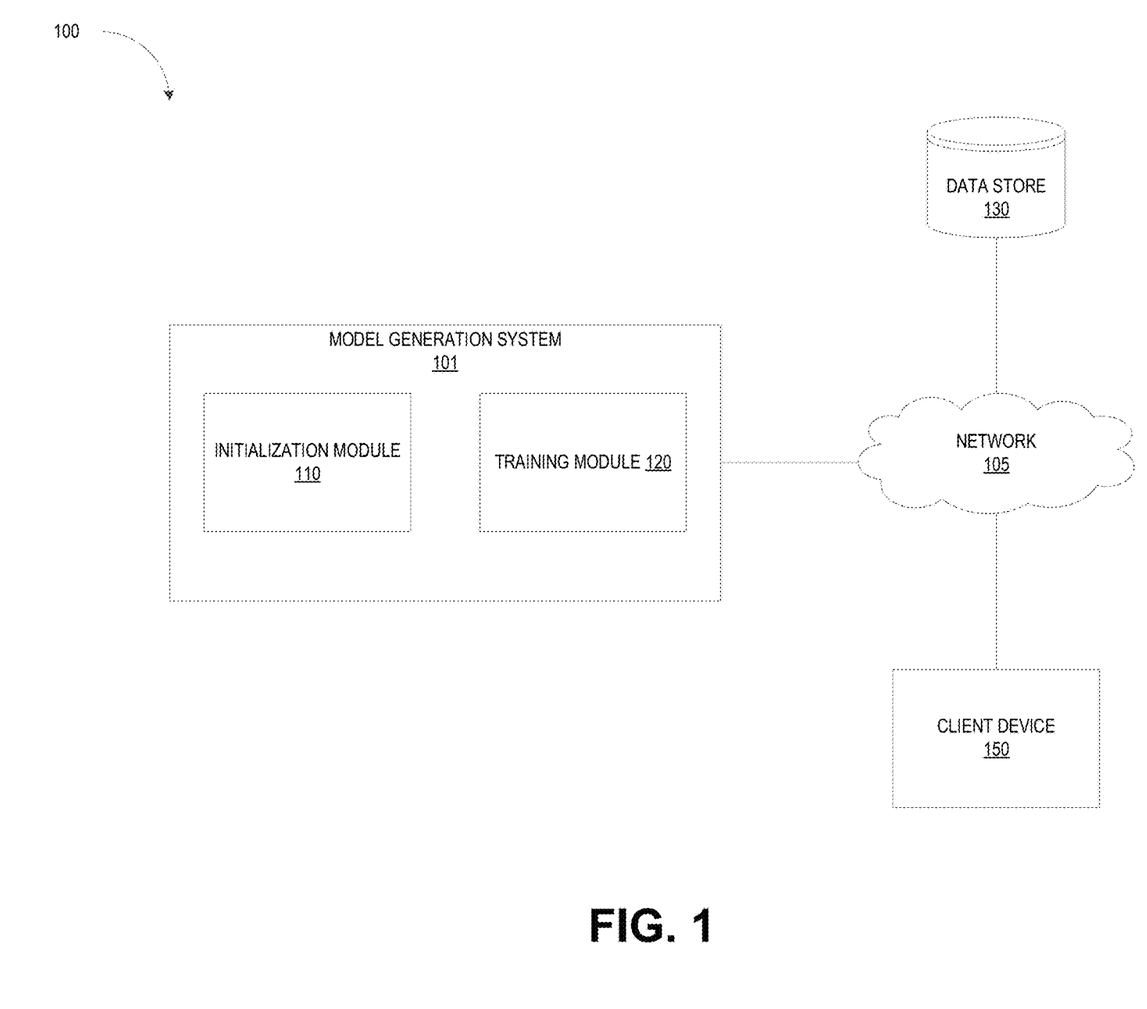
FIG. 1 is a diagram showing a system for use with implementations of the present disclosure.

FIG. 1 is a diagram showing a system architecture 100 for use with implementations of the present disclosure. Although specific components are disclosed in system architecture 100, it should be appreciated that such components are examples. That is, embodiments of the present invention are well suited to having various other components or variations of the components recited in system architecture 100. It is appreciated that the components in system architecture 100 may operate with other components than those presented, and that not all of the components of system architecture 100 may be required to achieve the goals of system architecture 100.

In one embodiment, system architecture 100 includes model generation system 101, network 105, and client device 150. Model generation system 101 may include various components, which may allow for data to be labeled and for machine learning models to be trained. Each component may perform different functions, operations, actions, processes, methods, etc., for a client device and/or may provide different services, functionalities, and/or resources for the client device. Model generation system 101, initialization module 110, and/or training module 120 may include one or more processing devices to perform operations related to labeling data and training machine learning models. In one embodiment, a processing device comprises one or more graphics processing units of one or more servers (e.g., including model generation system 101). Additional details of model generation system 101 are provided with respect to FIGS. 2-6. The system architecture may further include network 105 and data store 130.

The model generation system 101, the data store 130, and the client device 150 are operatively coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. The network 105 may carry communications (e.g., data, message, packets, frames, etc.) between the various components of system architecture 100 (e.g., between the model generation system 01, the client device 150, and the data store 130). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The model generation system 101 may comprise any suitable type of computing device or machine that has a programmable processor including, for example, server computers, desktop computers, laptop computers, tablet computers, smartphones, set-top boxes, etc. In some examples, the model generation system 101 may comprise a single machine or may include multiple interconnected machines (e.g., multiple servers configured in a cluster). The model generation system 101 may be implemented by a common entity/organization or may be implemented by different entities/organizations. For example, a model generation system 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the model generation system 101 may provide data labelling and/or model training functionality (e.g., functionality to label, tag, annotate, etc., data and/or to generate/train a model, such as a machine learning model) to a client device (e.g., client device 150). Further implementation details of the operations performed by model generation system 101 and/or the model generation system 101 are described with respect to FIGS. 2-5.

In some embodiments, the model generation system 101 may include an initialization module 110 and a training module. The initialization module 110 may generate labels and pseudo labels for a set of data (e.g., a set of images), as discussed in more detail below. The initiation module 110 may provide the set of data, the labels, and the pseudo labels to the training module 120 which will train a machine learning model using the set of data, the labels, and the pseudo labels. The training module 120 may also update the labels and/or pseudo labels for the data as the machine learning model is trained.

Figure 2:
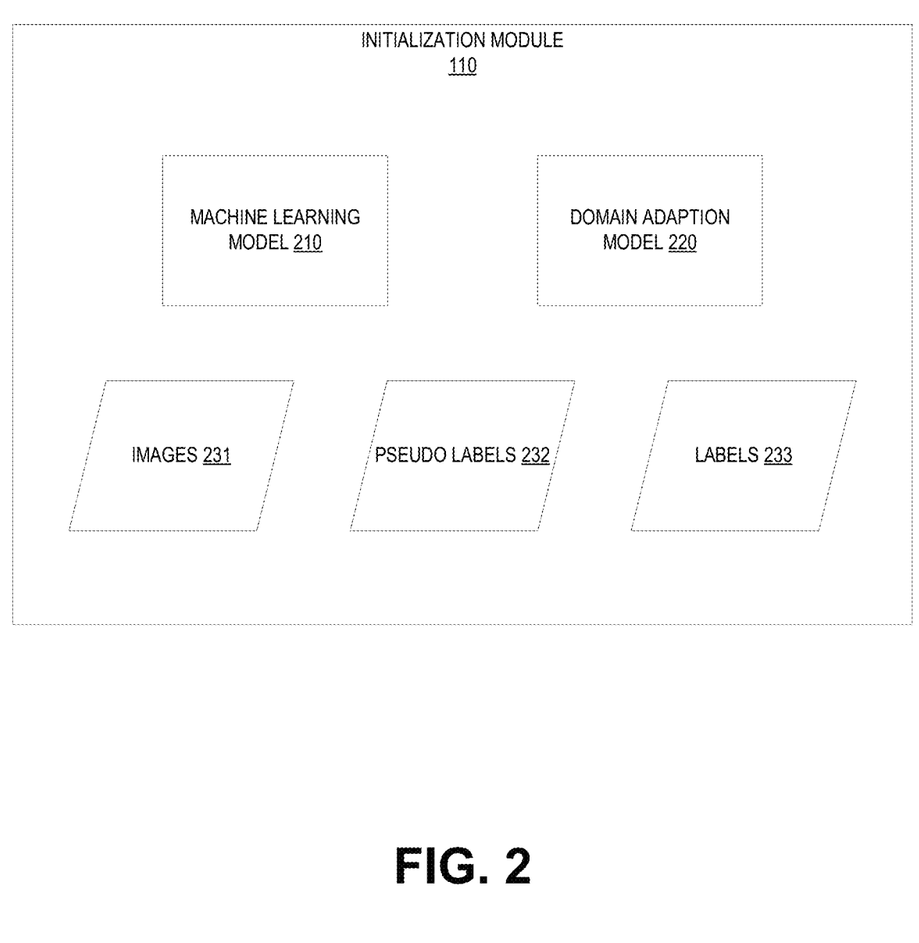
FIG. 2 is a block diagram illustrating an example initialization module, in accordance with some embodiments.

FIG. 2 is a block diagram illustrating an example initialization module 110, in accordance with some embodiments. As discussed above, the initialization module 110 generate pseudo labels and/or labels for the images 231. The initialization module 110 includes a machine learning model 210 and a domain adaption model 220. The machine learning model 210 may be a pre-trained model that was trained using a different set of data (e.g., was not trained using images 231).

In one embodiment, the initialization module 110 obtain a set of data, such as images 231. The images 231 may be images that may be used to train a machine learning model and/or may be provided as an input to a machine learning model for generating inferences (e.g., outputs, predictions, etc.). A first subset (e.g., a first group, a first portion, etc.) of the images 231 may be labelled (e.g., tagged, annotated, etc.). For example, some of the images 231 may be labelled to indicate what is depicted in those images 231 (e.g., objects in the image, scenery, time of day, weather conditions, etc.). The labels may be part of the first subset of images 231 or may be in a separate location (e.g., separate metadata, a separate file, etc.). The labels for the first subset of the images 231 may be referred to as real labels, reference labels, ground truth labels, etc. For example, the labels for the first subset of the images 231 may be labels that have been verified by a user or other computing systems. A second subset of the images 231 (e.g., a second group, the remaining images, etc.) may not be labelled (e.g., may be unlabeled). For example, there may not be any information that indicates what is depicted in the second subset of the images 231. The labels for an image 231 may also be referred to as classes for the image 231.

In one embodiment, the initialization module 110 may provide the images 231 to the machine learning model 210 as an input and the machine learning model 210 may generate a set of inferences based on the images 231 (e.g., using both the images that are labelled and unlabeled). The inferences generated by the machine learning model 210 may be based on features of the images that are detected in the images 231. For example, the machine learning model 210 may detect visual features such as shapes, objects, colors, shading, patterns, etc., within the images 231. The features that are detected may be mapped on a feature space (e.g., a graph or some other representation of the features) such that each feature that is detected may be represented as a point in the feature space.

In one embodiment, the initialization module 110 may determine one or more clusters of features (e.g., a set of clusters of features) in the feature space. The initialization module 110 may determine a center (a centroid, a center point, etc.) of a cluster and may identify other features of the cluster based on the center. For example, the initialization module 110 may identify a certain number (e.g., K) of features that are closest to the center and may use those the K features to form a cluster. In another example, the initialization module 110 may identify clusters of features that are within a radius of the center point and may use the features within the radius to form a cluster. The initialization module 110 may determine multiple centers and may determine multiple clusters of features based on the multiple centers.

In one embodiment, the initialization module 110 may associate each cluster with an initial pseudo label. For example, each feature in the cluster may be associated with the initial pseudo label. This may create a set of initial pseudo labels. The initial pseudo label may be a number, an alphanumeric string, etc., that may be used to identify a cluster and/or features in the cluster.

In one embodiment, the initialization module 110 may generate and/or train a domain adaption model 220 based on the initial set of pseudo labels. For example, the initialization module 110 may determine that a first group of the images 231 belong to a source domain while the remaining images (e.g., a second group of the images 231) belong to a target domain. Based on images in the source domain and the images in the target domain, the domain adaption model 220 may be trained and used to update the initial set of pseudo labels. For example, the domain adaption model may be trained to learn domain-invariant features. After training, the images 231 may be provided to the domain adaption model 220 and the domain adaption model 220 may determine one or more clusters of features in the feature space. The clusters of features determined by the domain adaption model 220 may be used to update the initial set of pseudo labels.

In one embodiment, the initialization module 110 may generate the set of pseudo labels 232 and the labels 233 based on the images 231 and the domain adaption model 220. For example, the initialization module 110 may use the domain adaption model 220 to update the initial set of pseudo labels as discussed above. After updating the initial set of pseudo labels, the domain adaption model 220 may determine a set of majority initial pseudo label for the set of labels. For example, the initialization module 110 may analyze the images 231 that are labeled (e.g., the first subset of the images 231 that are labelled using one of the labels from the set of labels 233). For each image that has a particular label (e.g., "cat"), the initialization module 110 may track the initial pseudo labels that are associated or assigned to those images. The initialization module 110 may identify the initial pseudo label that has the highest number of occurrences for the images 231 that have the particular label. The initial pseudo label that has the highest number of occurrences for the images for each real/reference label, may be referred to as a majority initial pseudo label.

In one embodiment, the initialization module 110 may generate the second set of labels based on the set of majority initial pseudo labels. The second set of labels may be generated for the second subset of images 231 that are unlabeled. As discussed above, the initialization module 110 may determine a majority initial pseudo label for the images 231 that have a particular label (e.g., "cat"). For each of the images 231 that are unlabeled and that also have an initial pseudo label that matches the majority initial pseudo label, the initialization module 110 may label those unlabeled images with the same particular label. The initialization module 110 may perform or repeat these operations for each label and/or majority initial pseudo label until all of the images 231 have both an initial pseudo label and a label.

Figure 3:
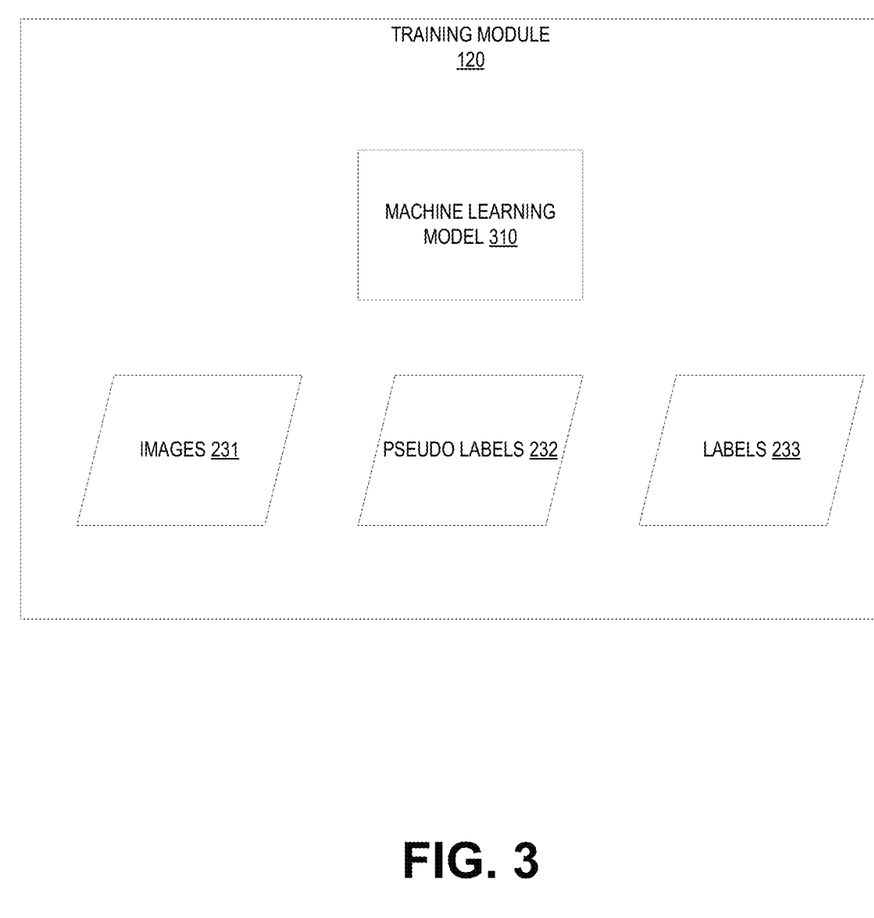
FIG. 3 is a block diagram illustrating an example training module, in accordance with some embodiments.

FIG. 3 is a block diagram illustrating an example training module 120, in accordance with some embodiments. As discussed above, the initialization module 120 may generate an initial set of pseudo labels and labels based on a first machine learning model (e.g., machine learning model 210 illustrated in FIG. 2) and a domain adaption model (e.g., domain adaption model 220 illustrated in FIG. 2). After generating the initial set of pseudo labels and the labels for the images 231, the initialization module 120 may provide them to the training module 120.

In one embodiment, the training module 120 may generate and/or train machine learning model 310 based on the images 231. For example, the training module 120 may use the images 231 to train the machine learning model 310. The training module 120 may also update the pseudo labels 232 and the labels 233 based on the inferences (e.g., outputs, predictions, etc.) generated by the machine learning model 310.

As discussed above, the training module 120 may update one or more of the pseudo labels 232 and/or one or more of the labels 233. The machine learning model 310 may generate inferences (e.g., labels) for the images 231 (e.g., each image 231 is associated or is labelled with at least one label). Each label for an image 231 may be associated with a confidence level. For example, the machine learning model 310 may determine a label for an image and may have a 95% confidence level for that label. In one embodiment, the training module 120 may determine (e.g., identify, select, etc.) the labels that have a confidence level greater than a threshold confidence level. For example, the training module 120 may identify all images 231 that have a particular label (e.g., the label "dog") and have a confidence level greater than 90% (or some other appropriate threshold confidence level) for that particular label.

In one embodiment, the training module 120 may determine the pseudo labels associated with the images that have the particular label (e.g., "dog") and have a confidence level greater than the threshold confidence level (e.g., 90%). The training module 120 may identify the majority pseudo label for the images that have the particular label. As discussed above, the majority pseudo label may be the pseudo label that occurs the most times for the images that have the particular label. The training module 120 may update all of the pseudo labels for the images that have the particular label to the majority pseudo label.

In one embodiment, the training module 120 may update one or more of the pseudo labels 232 and the labels 233, and may generate/train the machine learning model 310 iteratively (e.g., in a loop). For example, the training module 120 may update one or more of the pseudo labels 232 and the labels 233, and may provide the images 231 (with the updated pseudo labels and labels) to the machine learning model 310. Based the labels (e.g., inferences) generated by the machine learning model 310, the training module 120 may update one or more of the pseudo labels 232 and the labels 233, and may update the weights of the machine learning model 310 (e.g., may tune or train the machine learning model 310). The updated machine learning model 310 will then generate inferences again based on the images 231 and the updated labels. The process and/or operations (e.g., updating pseudo labels 232, labels 233, and training the machine learning model 310, etc.,) may be repeated.

In one embodiment, the training module 120 may update one or more of the pseudo labels 232 and the labels 233, and may generate/train the machine learning model 310 in a loop until accuracy of the machine learning model 310 stops improving. For example, if the pseudo labels 232 and/or the labels 233 are not updated after an iteration, the training module 120 may determine that the machine learning model 310 is trained (e.g., full trained) and may stop the loops/iterations. In another example, if the number of pseudo labels 232 and/or the number of labels 233 that were updated (in an iteration) is below a threshold number, the training module 120 may stop updating the pseudo labels 232 and labels 233, and/or stop training the machine learning model 310.

Figure 4A:
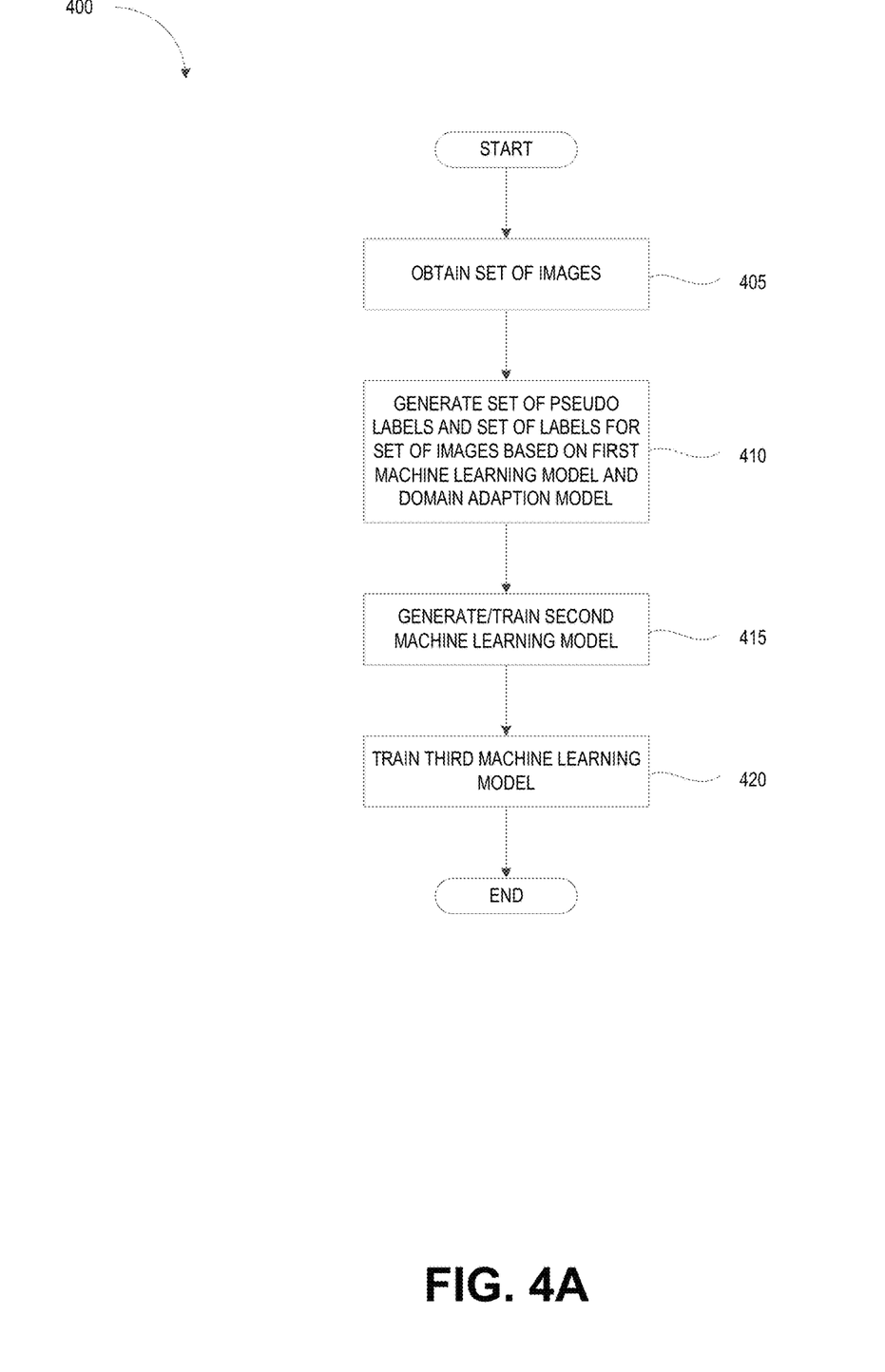
FIG. 4A is a graphical diagram showing a method of generating labels for data and for training/generating a machine learning model, in accordance with some embodiments.

FIG. 4A is a graphical diagram showing a method 400 of generating labels for data and for training/generating a machine learning model, in accordance with some embodiments. For example, the processes described with reference to FIG. 4A may be performed by one or more of processing logic of model generation system 101, the initialization module 110, and the training module 120 as described with reference to FIG. 1. The method 400 may generate labeled data (e.g., may generate labels for unlabeled data) and/or may train a machine learning model (e.g., a CNN, a classifier, a neural network, etc.).

At block 405, the method 400 may obtain a set of images (e.g., may read or access the set of images from a data storage device). As discussed above, the set of images includes a first subset and a second subset. The first subset is associated with a first set of labels (e.g., the first subset is labeled). The first set of labels may be referred to as reference labels, ground truths, ground truth labels, etc. The second subset is unlabeled.

At block 410, the method 400 may generate a set of pseudo labels for the set of images and a second set of labels for the second subset based on the first subset, the second subset, a first machine learning model, and a domain adaption model. For example, the method 400 may use the first machine learning model to identify clusters of features, as discussed above. The method 400 may also use the domain adaption model to generate the pseudo labels, as discussed above At block 415, the method 400 may generate (e.g., train) a second machine learning model. The second machine learning model is trained/generated based on the set of images, the set of pseudo labels, the first set of labels, and the second set of labels, as discussed above. The second set of labels is updated based on one or more inferences generated by the second machine learning model. For example, as the second machine learning model is trained/tuned, the pseudo labels and/or labels may be updated based on the inferences of the second machine learning model. Each images of the set of images may be associated with one or more labels from the second set of labels. After the second set of labels have been updated and/or finalized (e.g., after one or more iterations of updates), the set second of labels may be a reference labels for the set of images (e.g., a final set of reference labels for the set of images).

In one embodiment, the second machine learning model may be used to generate labels for additional sets of images. For example, the second machine learning model may generate reference labels for additional sets of images.

At block 420, the method 400 may train a third machine learning model based on the set of images and the second set of labels. For example, the third machine learning model may be a neural network convolutional neural network (CNN), an object classification/detection model, etc., that is trained using the set of images and the second set of labels.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation. Furthermore, additional operations (not illustrated in FIG. 4A) may be performed in between the operations, blocks, etc., illustrated in FIG. 4A.

Figure 4B:
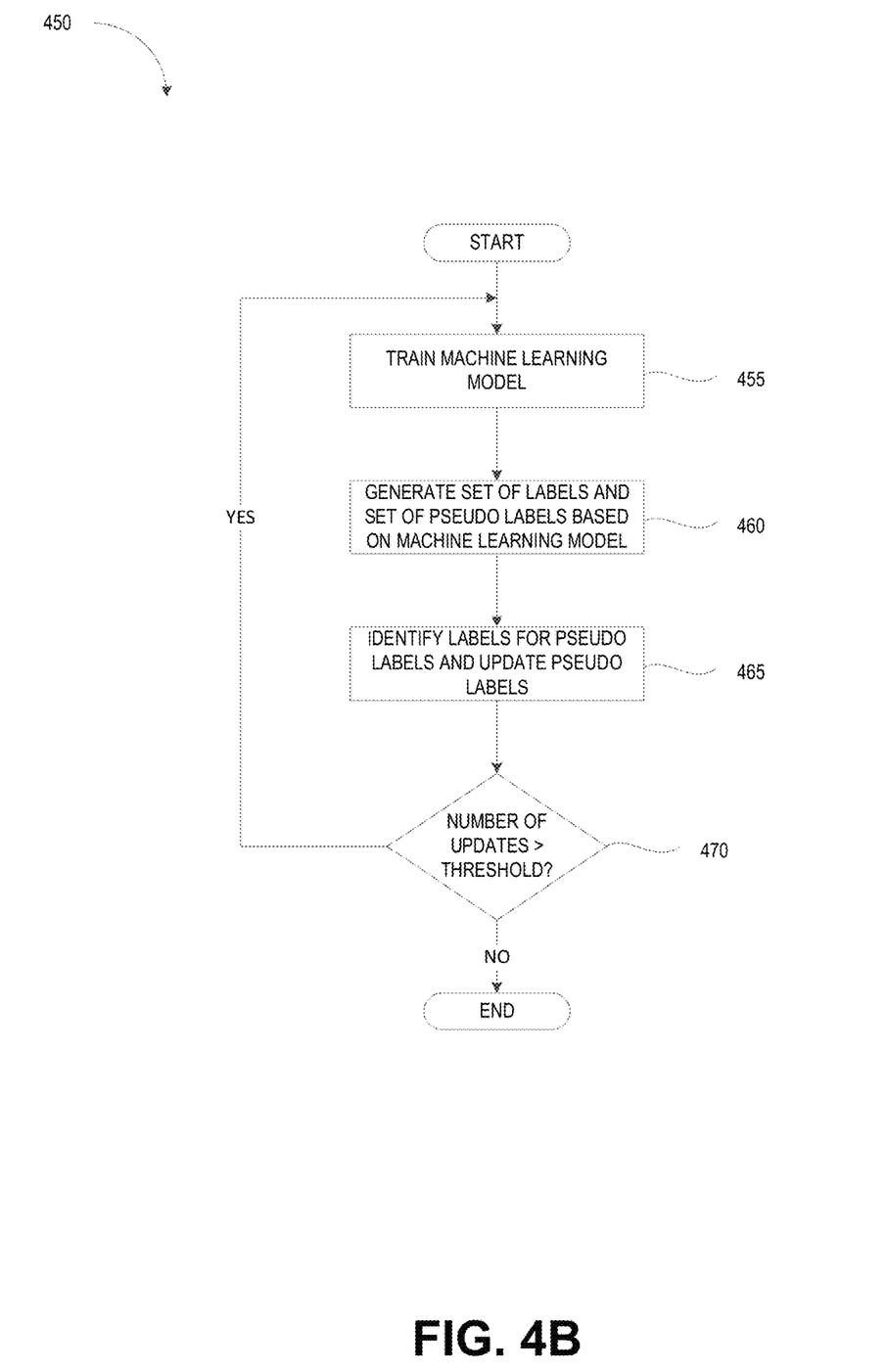
FIG. 4B is a graphical diagram showing a method of generating labels for data and for training/generating a machine learning model, in accordance with some embodiments.

FIG. 4B is a graphical diagram showing a method 450 of generating labels for data and for training/generating a machine learning model, in accordance with some embodiments. For example, the processes described with reference to FIG. 4B may be performed by one or more of processing logic of model generation system 101, the initialization module 110, and the training module 120 as described with reference to FIG. 1. The method 450 may generate label data (e.g., may generate labels for unlabeled data) and/or may train a machine learning model (e.g., a CNN, a classifier, a neural network, etc.). In one embodiment, the method 450 may illustrate operations, processes, actions, functions, etc., that are performed at block 415 of FIG. 4A.

At block 455, the method 450 trains a machine learning model based on a set of images, a set of labels for the set of images, and/or a set of pseudo labels for the set of images. For example, referring to FIG. 3, the method 450 may train the machine learning model 310 based on the pseudo labels 232 and/or the labels 233.

At block 460, the method 450 may generate and/or update the set of labels. For example, referring to FIG. 3, the method 450 may use the machine learning model 310 to update (e.g., to generate a new set, regenerate, etc.) pseudo labels 232 and/or the labels 233.

At block 465, the method 450 identify one or more majority labels associated with the pseudo labels. For example, for images that have a particular pseudo label, the method 450 may identify, determine, etc., the majority label for the particular pseudo label. The label that has the highest number of occurrences for the images with particular pseudo label, may be referred to as a majority label. The method 405 may also identify all images that have a label that matches the majority label, and may update the pseudo labels of those images (which have labels that match the majority label) to the particular pseudo label.

At block 470, the method 450 may determine whether the number of pseudo labels that were updated is greater that a threshold (e.g., more than 10, 50, 200, or some other appropriate number). If the number of pseudo labels that were updated is not greater than the threshold, the method 450 ends. If the number of pseudo labels that were updated is greater than the threshold, the method 450 may proceed to block 455 and may train the machine learning model based on the Various operations are described as multiple discrete operations, in turn, in a manner that is most helpful in understanding the present disclosure, however, the order of description may not be construed to imply that these operations are necessarily order dependent. In particular, these operations need not be performed in the order of presentation. Furthermore, additional operations (not illustrated in FIG. 4) may be performed in between the operations, blocks, etc., illustrated in FIG. 4.

Figure 5:
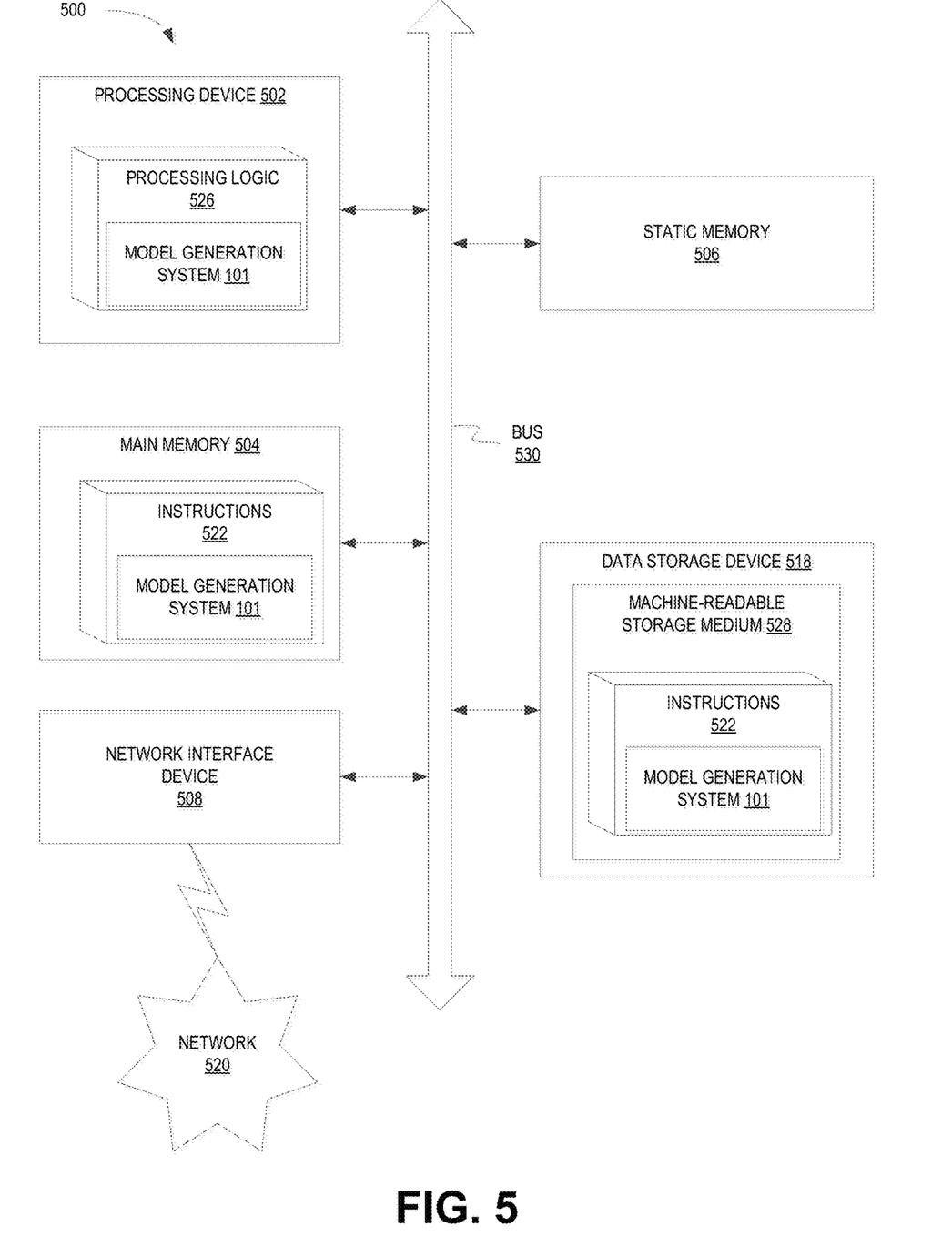
FIG. 5 is an illustration showing an example computing device which may implement the embodiments described herein.

FIG. 5 illustrates a diagrammatic representation of a machine in the example form of a computer system 500 within which a set of instructions 522, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server computer system, such as system architecture 100.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system architecture 100 shown in FIG. 1, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute system architecture 100. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform the methods and operations described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, programming languages, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
obtaining a set of images, wherein:
the set of images comprises a first subset and a second subset; and
the first subset is associated with a first set of reference labels;
generating a set of pseudo labels for the set of images and a second set of labels for the second subset based on the first subset, the second subset, a first machine learning model, and a domain adaption model including a source domain and a target domain, wherein the source domain and the target domain are based on clusters of features determined by the first machine learning model, such that a radius around a centroid of each of the clusters of features separates the source domain and the target domain;
generating second machine learning model, wherein:
the second machine learning model is generated based on the set of images, the set of pseudo labels, the first set of reference labels, and the second set of labels; and
the second set of labels is updated based on one or more inferences generated by the second machine learning model; and
training a third machine learning model based on the set of images and the second set of labels.

2. The method of claim 1, wherein generating the set of pseudo labels and the second set of labels comprises:
determining a set of clusters of features based on the first machine learning model and set of images; and
associating each cluster of the set of clusters with an initial pseudo label to determine an initial set of pseudo labels.

3. The method of claim 2, wherein generating the set of pseudo labels and the second set of labels further comprises:
generating the domain adaption model based on the initial set of pseudo labels; and
generating the set of pseudo labels based on the set of images and the domain adaption model.

4. The method of claim 3, wherein generating the set of pseudo labels and the second set of labels further comprises:
determining a set of majority initial pseudo labels for the set of reference labels, wherein each majority initial pseudo label of the set of majority initial pseudo labels is associated with a reference label from the set of reference labels.

5. The method of claim 4, wherein generating the set of pseudo labels and the second set of labels further comprises:
generating the second set of labels based on the set of majority initial pseudo labels for each real label.

6. The method of claim 1, wherein generating second machine learning model comprises:
generating a set of inferences based on the set of data and the second machine learning model; and
updating one or more of pseudo labels of the set of pseudo labels based on the set of inferences.

7. The method of claim 6, wherein updating the one or more of pseudo labels of the set of pseudo labels based on the set of inferences comprises:
determining one or more inferences associated with one or more confidence levels that are greater than a threshold confidence;
determining the one or more pseudo labels based on the one or more inferences and a majority pseudo label for each real label; and
updating the one or more pseudo labels based on the majority pseudo label.

8. A system comprising:
a memory to store data; and
a processing device, operatively coupled to the memory, to:
obtain a set of images, wherein:
the set of images comprises a first subset and a second subset; and
the first subset is associated with a first set of reference labels;
generate a set of pseudo labels for the set of images and a second set of labels for the second subset based on the first subset, the second subset, a first machine learning model, and a domain adaption model including a source domain and a target domain, wherein the source domain and the target domain are based on clusters of features determined by the first machine learning model, such that a radius around a centroid of each of the clusters of features separates the source domain and the target domain;
generate second machine learning model, wherein:
the second machine learning model is generated based on the set of images, the set of pseudo labels, the first set of reference labels, and the second set of labels; and
the second set of labels is updated based on one or more inferences generated by the second machine learning model.

9. The system of claim 8, wherein to generate the set of pseudo labels and the second set of labels the processing device is to:
determine a set of clusters of features based on the first machine learning model and set of images; and
associate each cluster of the set of clusters with an initial pseudo label from an initial set of pseudo labels.

10. The system of claim 9, wherein generating the set of pseudo labels and the second set of labels further comprises:
generating the domain adaption model based on the initial set of pseudo labels; and
generating the set of pseudo labels based on the set of images and the domain adaption model.

11. The system of claim 10, wherein generating the set of pseudo labels and the second set of labels further comprises:
determining a set of majority initial pseudo labels for the set of reference labels, wherein each majority initial pseudo label of the set of majority initial pseudo labels is associated with a reference label from the set of reference labels.

12. The system of claim 11, wherein generating the set of pseudo labels and the second set of labels further comprises:
generating the second set of labels based on the set of majority initial pseudo labels.

13. The system of claim 8, wherein generating second machine learning model comprises:
generating a set of inferences based on the set of data and the second machine learning model; and
updating one or more of pseudo labels of the set of pseudo labels based on the set of inferences.

14. The system of claim 13, wherein updating the one or more of pseudo labels of the set of pseudo labels based on the set of inferences comprises:
determining one or more inferences associated with one or more confidence levels that are greater than a threshold confidence;
determining the one or more pseudo labels based on the one or more inferences and a majority pseudo label; and
updating the one or more pseudo labels based on the majority pseudo label.

15. A non-transitory computer-readable storage medium having instructions stored thereon that, when executed by a processing device, cause the processing device to:
obtain a set of images, wherein:
the set of images comprises a first subset and a second subset; and
the first subset is associated with a first set of reference labels;
generate a set of pseudo labels for the set of images and a second set of labels for the second subset based on the first subset, the second subset, a first machine learning model, and a domain adaption model including a source domain and a target domain, wherein the source domain and the target domain are based on clusters of features determined by the first machine learning model, such that a radius around a centroid of each of the clusters of features separates the source domain and the target domain;

generate second machine learning model, wherein:
the second machine learning model is generated based on the set of images, the set of pseudo labels, the first set of reference labels, and the second set of labels; and the second set of labels is updated based on one or more inferences generated by the second machine learning model.

16. The non-transitory computer-readable storage medium of claim 15, wherein generating the set of pseudo labels and the second set of labels comprises:
determining a set of clusters of features based on the first machine learning model and set of images; and
associating each cluster of the set of clusters with an initial pseudo label from an initial set of pseudo labels.

17. The non-transitory computer-readable storage medium of claim 16, wherein generating the set of pseudo labels and the second set of labels further comprises:

generating the domain adaption model based on the initial set of pseudo labels; and
generating the set of pseudo labels based on the set of images and the domain adaption model.

18. The non-transitory computer-readable storage medium of claim 17, wherein generating the set of pseudo labels and the second set of labels further comprises:
determining a set of majority initial pseudo labels for the set of reference labels, wherein each majority initial pseudo label of the set of majority initial pseudo labels is associated with a reference label from the set of reference labels.

19. The non-transitory computer-readable storage medium of claim 18, wherein generating the set of pseudo labels and the second set of labels further comprises:
generating the second set of labels based on the set of majority initial pseudo labels.

20. The non-transitory computer-readable storage medium of claim 15, wherein generating second machine learning model comprises:
generating a set of inferences based on the set of data and the second machine learning model; and
updating one or more of pseudo labels of the set of pseudo labels based on the set of inferences.

* * * * *